July 20, 1937. J. C. VAN AKEN Re. 20,448
HAT HOLDER
Original Filed July 3, 1934
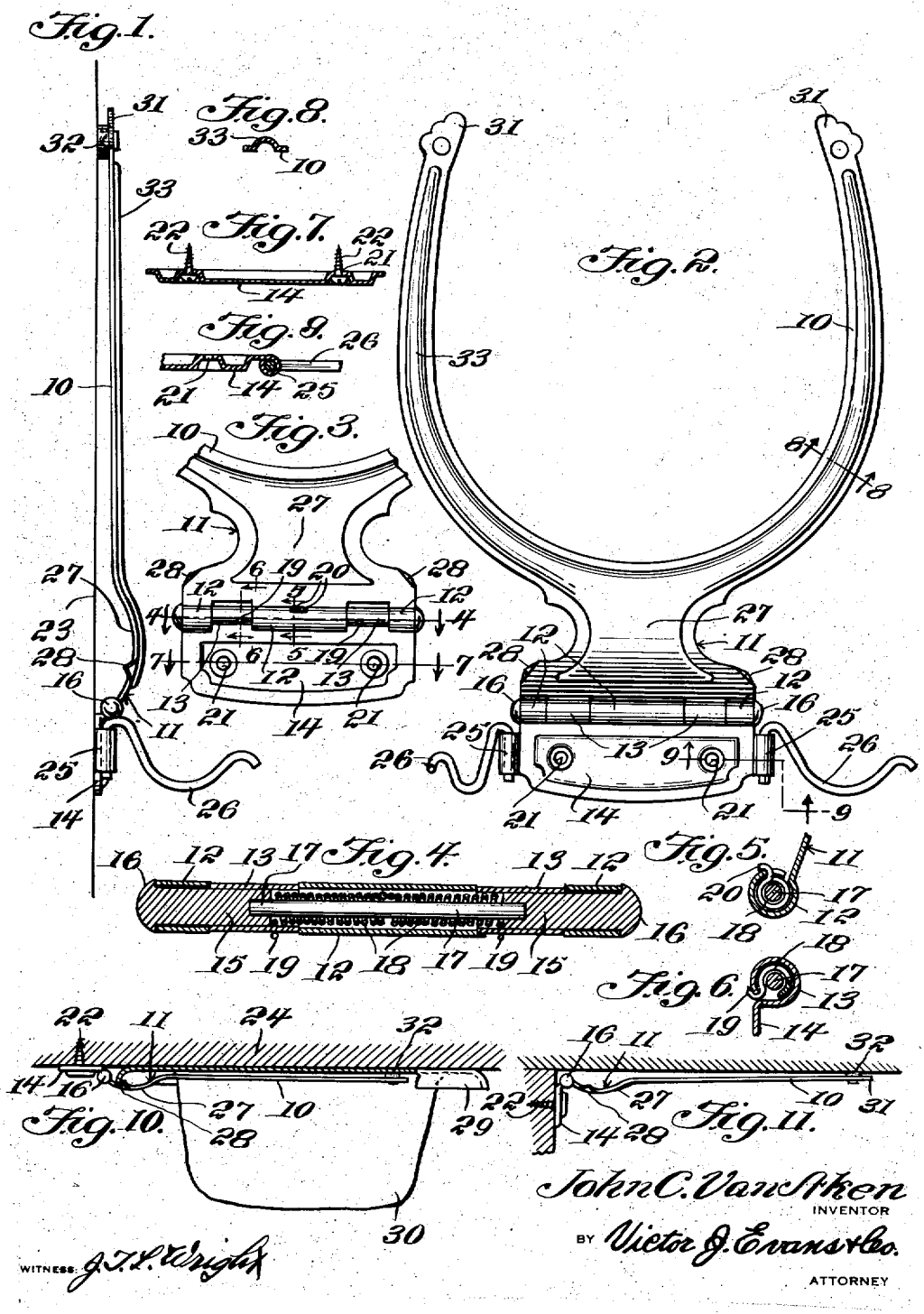
John C. Van Aken
INVENTOR
BY Victor J. Evans & Co.
ATTORNEY
WITNESS: J. T. L. Wright Reissued July 20, 1937

Re. 20,448

UNITED STATES PATENT OFFICE 20,448

HAT HOLDER

John C. Van Aken, Ridgway, Pa.

Original No. 2,003,659, dated June 4, 1935, Serial No. 733,679, July 3, 1934. Application for reissue December 30, 1935, Serial No. 56,841

5 Claims. (Cl. 211—32)

This invention relates to a holder and more especially to a hat holder or a combination hat and garment holder.

The primary object of the invention is the provision of a holder of this character, wherein in hat of the brim style can be placed therein and held when not being worn, the holder being of novel construction and adapted to clamp the hat without disfiguring the same while in the holder, so that there is no liability of the freeing or the dropping of the hat from the holder.

Another object of the invention is the provision of a holder of this character, wherein through the medium of a fork hingedly supported, a hat of the brim style can be readily and easily introduced into the fork and such hat will be held while not worn, the fork under the hinge action and a spring coacting with the hinge clamping the hat against a support, wall or the like, the latter being susceptible of clamping the hat either perpendicularly or horizontally according to the requirement of the mounting of the holder, and also garments may be hung on the holder.

A further object of the invention is the provision of a holder of this character which is simple in construction, thoroughly reliable and effective in its purpose, neat in appearance, readily and easily swung to receiving position for a hat and automatically swung to a position for clamping such hat, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a side elevation of the holder constructed in accordance with the invention.

Figure 2 is a plan view thereof.

Figure 3 is an enlarged fragmentary plan view looking toward the innermost side of the holder with the garment hangers removed.

Figure 4 is a sectional view on the line 4—4 of Figure 3 looking in the direction of the arrows.

Figure 5 is a sectional view on the line 5—5 of Figure 3 looking in the direction of the arrows.

Figure 6 is a sectional view on the line 6—6 of Figure 3 looking in the direction of the arrows.

Figure 7 is a sectional view on the line 7—7 of Figure 3 looking in the direction of the arrows.

Figure 8 is a sectional view on the line 8—8 of Figure 2 looking in the direction of the arrows.

Figure 9 is a sectional view on the line 9—9 of Figure 2 looking in the direction of the arrows.

Figure 10 is a view similar to Figure 1 showing the holder disposed in a horizontal position and with a hat held therein.

Figure 11 is a view similar to Figure 10 showing a different mounting of the holder.

Similar reference characters indicate corresponding parts throughout the several views in the drawing.

Referring to the drawing in detail, the holder comprises a forked frame 10 preferably of substantially horseshoe shape and having medially thereof a hinge leaf extension 11 provided with pintle eyes or sleeves 12 which are adapted for alignment with pintle eyes or sleeves 13 on an attaching plate 14. Fitted in the outermost pintle eyes 12 of the extension 11 and in the pintle eyes 13 of the plate 14 are pintle members 15, these at their outer ends having the heads 16, and joining these members for separation is a rod 17 about which is trained a pair of coiled tensioning springs, 18 these at their outer ends being attached at 19, to the eyes 13 of the plate 14, while the inner ends of the said springs are attached, at 20, to the intermediate pintle eye 12 on the extension 11, so that the frame 10 will have a tensioned swinging movement.

The plate 14 is provided with suitable openings 21 for accommodation fasteners 22 which are adapted to secure the said plate to a support, as for example, a vertical wall 23, or to an overhead support, as at 24.

Formed at opposite ends of the plate 14 are socket sleeves 25, these having swingingly mounted therein garment hooks 26, so that garments may be hung thereon when the holder is carried by a support.

The extension 11 of the frame 10 has the curvature 27 therein and at opposite edges of this extension slightly spaced from the sleeves or eyes 12 thereof are spurs 28, the curvature 27 being designed to accommodate the brim 29 of a hat 30 when placed within the frame 10, while the spurs 28 bite into the brim to prevent it interfering with the hinge point of the frame 10 with the plate 14.

On the limbs of the frame 10 at the extremities 31 thereof, are cushioning buttons 32, these serving to contact with the brim 29 of the hat 30 when within the frame 10 and on removal of the hat from said frame the buttons 32 contact with the support without marring of the same.

The frame 10 carries an outwardly struck bead 33 to give strength and rigidity thereto, the bead formation being projected into the extension 11 to strengthen it correspondingly to the frame.

This bead is particularly advantageous where thin sheet flexible material is used to construct the hat holder. In its normal use when the hat is to be released the fork which holds the hat brim against the wall will be released by pulling the fork at its tip ends. If no strengthening bead is provided it is readily seen that the fork prongs would tend to bend or that the holder would give way at the extension 11.

It will be apparent that the plate 14 is made with and without the sleeve 25 which is optional with the manufacturer of the holder.

In the use of the device, assuming that the plate 14 has been made secure to the vertical wall 23 and normally under the action of the springs 18 the frame 10 is sustained substantially parallel with the face of the wall, the buttons 32 being in contact therewith. When it is desired to place a hat within the frame 10 of the holder it is only necessary to pull outwardly upon this frame and place the crown part of the hat within the frame, with the brim 29 of said hat resting over the frame. On release of the frame, the same returns to normal position, as shown in Figure 1 of the drawing, thus holding the hat firmly and securely when in this position.

The holder is adaptable for mounting as shown in Figure 10 or as shown in Figure 11 of the drawing.

I claim:

1. A holder of the character described comprising a forked frame having a hinge leaf extension provided with pintle sleeves, an attaching plate having pintle sleeves interfitted with the pintle sleeves on the extension, pintle members fitted within said pintle sleeves, a rod interfitting the pintle members, coiled springs having their outer ends attached to the pintle sleeves on the plate and their inner ends attached to one pintle sleeve on the extension, and cushioning buttons at the extremities of said forked frame.

2. A hat holder of the character described comprising a forked frame having a hinge leaf extension provided with pintle sleeves, an attaching plate having pintle sleeves interfitted with the pintle sleeves on the extension, pintle members fitted within said pintle sleeves, a rod interfitting the pintle members, coiled springs having their outer ends attached to the pintle sleeves on the plate and their inner ends attached to one pintle sleeve on the extension, and frame spacing means projecting from the inner faces of said frame at the extremities thereof.

3. A hat holder of the character described comprising a forked frame having a hinge leaf extension provided with pintle sleeves, an attaching plate having pintle sleeves interfitted with the pintle sleeves on the extension, pintle members fitted within said pintle sleeves, a rod interfitting the pintle members, coiled springs having their outer ends attached to the pintle sleeves on the plate and their inner ends attached to one pintle sleeve on the extension and spacing means projecting from the inner face of said frame.

4. A hat holder of the character described comprising a forked frame having a hinge leaf extension provided with pintle sleeves, an attaching plate having pintle sleeves interfitted with the pintle sleeves on the extension, a rod disposed through said pintle sleeves and interconnecting the forked frame and attaching plate, coiled springs disposed about said rod each having one end held by a sleeve on the extension and the other end held by a sleeve on the attaching plate to provide a spring hinged connection therebetween.

5. A hat holder of the character described comprising a forked frame having a hinge leaf extension provided with pintle sleeves, an attaching plate having pintle sleeves interfitted with the sleeves on the extension, pintle rods extending through the outermost of said pintle sleeves and into the next adjacent pintle sleeve, coiled springs disposed between the ends of said pintle rods each having one end held by a sleeve on the extension and the other end held by a sleeve on the attaching plate to provide a spring hinge connection therebetween.

JOHN C. VAN AKEN.